Sept. 15, 1942.   W. WEGENER   2,296,075
CARD CONTROLLED BOOKKEEPING MACHINE
Filed Dec. 23, 1930   9 Sheets-Sheet 1

Fig.1

| III | | IV | | V | | VI | | VII | |
|---|---|---|---|---|---|---|---|---|---|
| 1 | 2 | | | | | | | | |
| Client's No. | day | month | Debit-Turnovers $ | ¢ | Credit-Turnovers $ | ¢ | Debit-Balance $ | ¢ | Credit-Balance $ | ¢ |
| 1520 | 30 | 12 | | | 3580 | 00 | | | 3580 | 00 |
| 1520 | 1 | 1 | 2000 | 00 | 4500 | 00 | | | 6080 | 00 |
| | 2 | | | | | | | | 6080 | 00 |
| | 3 | | | | | | | | 6080 | 00 |
| 1520 | 4 | 1 | 2200 | 00 | | | | | 3880 | 00 |
| 1520 | 5 | 1 | 5075 | 00 | 700 | 00 | 495 | 00 | | |
| 1520 | 6 | 1 | 6577 | 95 | | | 7072 | 95 | | |
| 1520 | 7 | 1 | 4315 | 00 | 31401 | 50 | | | 20013 | 55 |
| | 8 | | | | | | | | 20013 | 55 |
| | 9 | | | | | | | | 20013 | 55 |
| 1520 | 10 | 1 | 21500 | 00 | | | 1486 | 45 | | |
| 1520 | 11 | 1 | | | 109 | 35 | 1377 | 10 | | |
| | 12 | | | | | | 1377 | 10 | | |
| 1520 | 13 | 1 | 2000 | 00 | 5500 | 00 | | | 2122 | 90 |
| | 14 | | | | | | | | 2122 | 90 |
| | 15 | | | | | | | | 2122 | 90 |
| | 16 | | | | | | | | 2122 | 90 |
| | 17 | | | | | | | | 2122 | 90 |
| 1520 | 18 | 1 | 6000 | 00 | 3473 | 00 | 404 | 10 | | |
| | 19 | | | | | | 404 | 10 | | |
| 1520 | 20 | 1 | 5190 | 00 | 3000 | 00 | 2594 | 10 | | |
| 1520 | 21 | 1 | 3500 | 00 | 6500 | 00 | | | 405 | 90 |
| | 22 | | | | | | | | 405 | 90 |
| 1520 | 23 | 1 | 2000 | 00 | 4500 | 00 | | | 2905 | 90 |
| 1520 | 24 | 1 | 800 | 00 | 5400 | 00 | | | 7505 | 90 |
| | 25 | | | | | | | | 7505 | 90 |
| 1520 | 26 | 1 | 5100 | 00 | 1000 | 00 | | | 3405 | 90 |
| | 27 | | | | | | | | 3405 | 90 |
| 1520 | 28 | 1 | 7000 | 00 | | | 3594 | 10 | | |
| | 29 | | | | | | 3594 | 10 | | |
| | | | Total of the table of interest | | | | 22399 | 10 | 121896 | 45 |

Inventor
Wilhelm Wegener

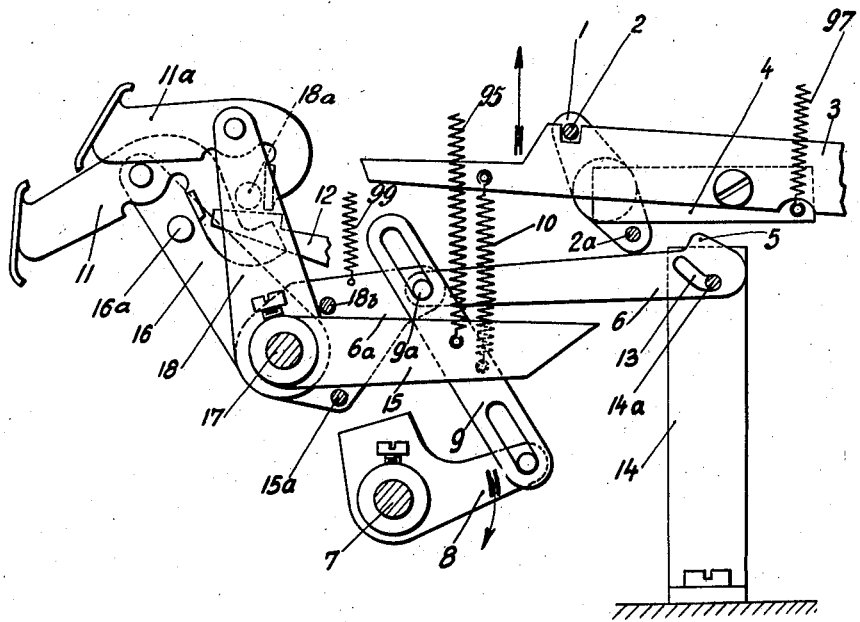

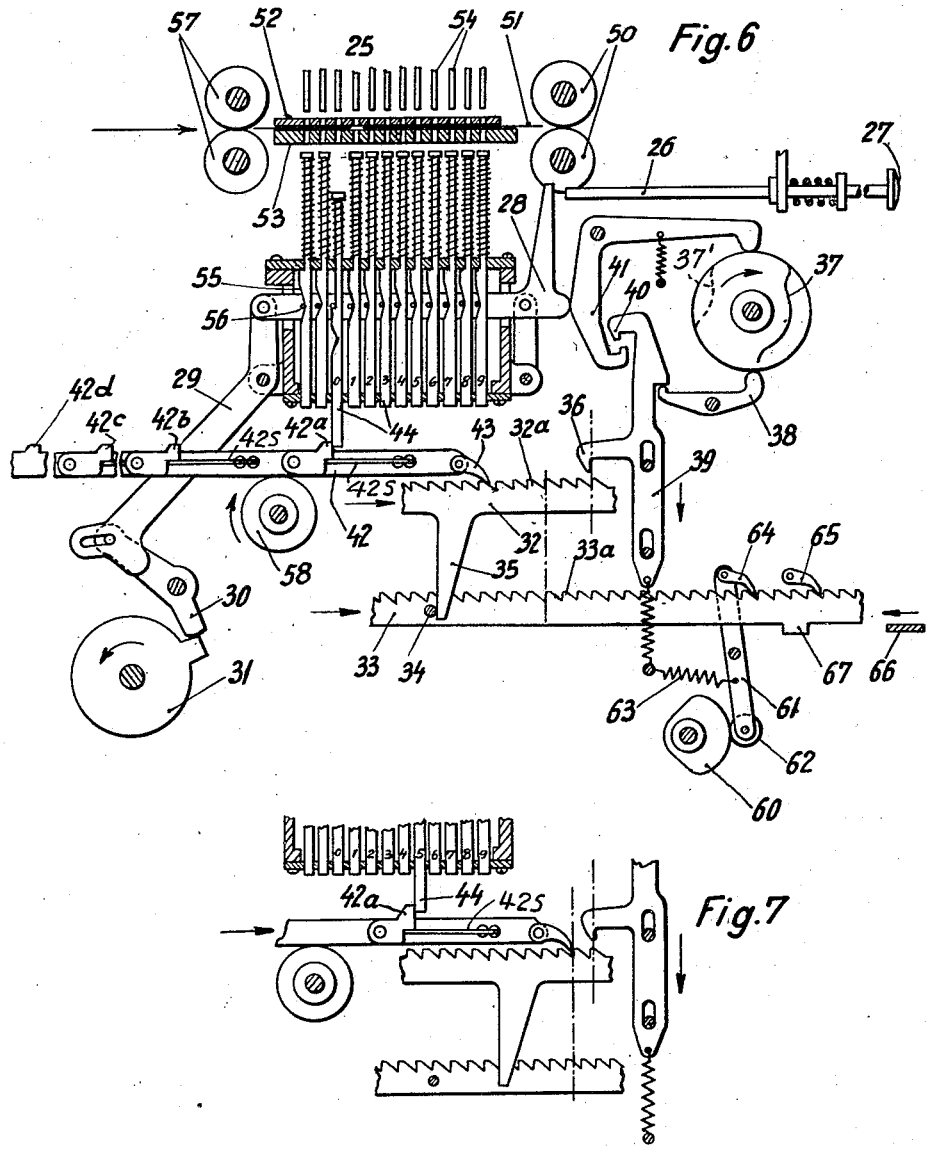

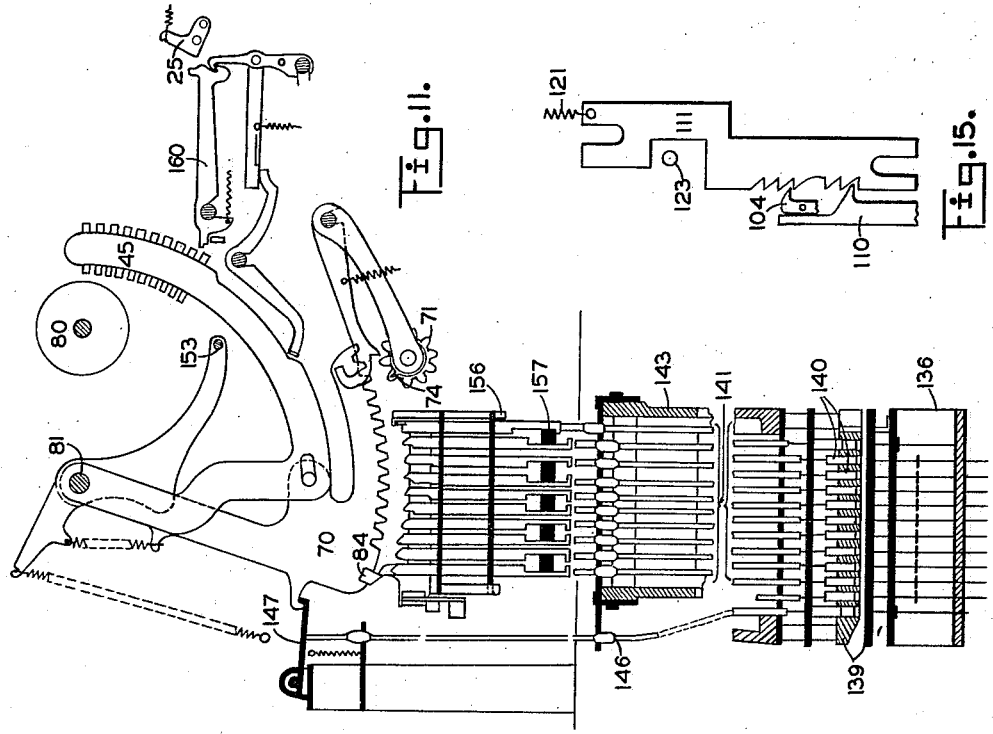

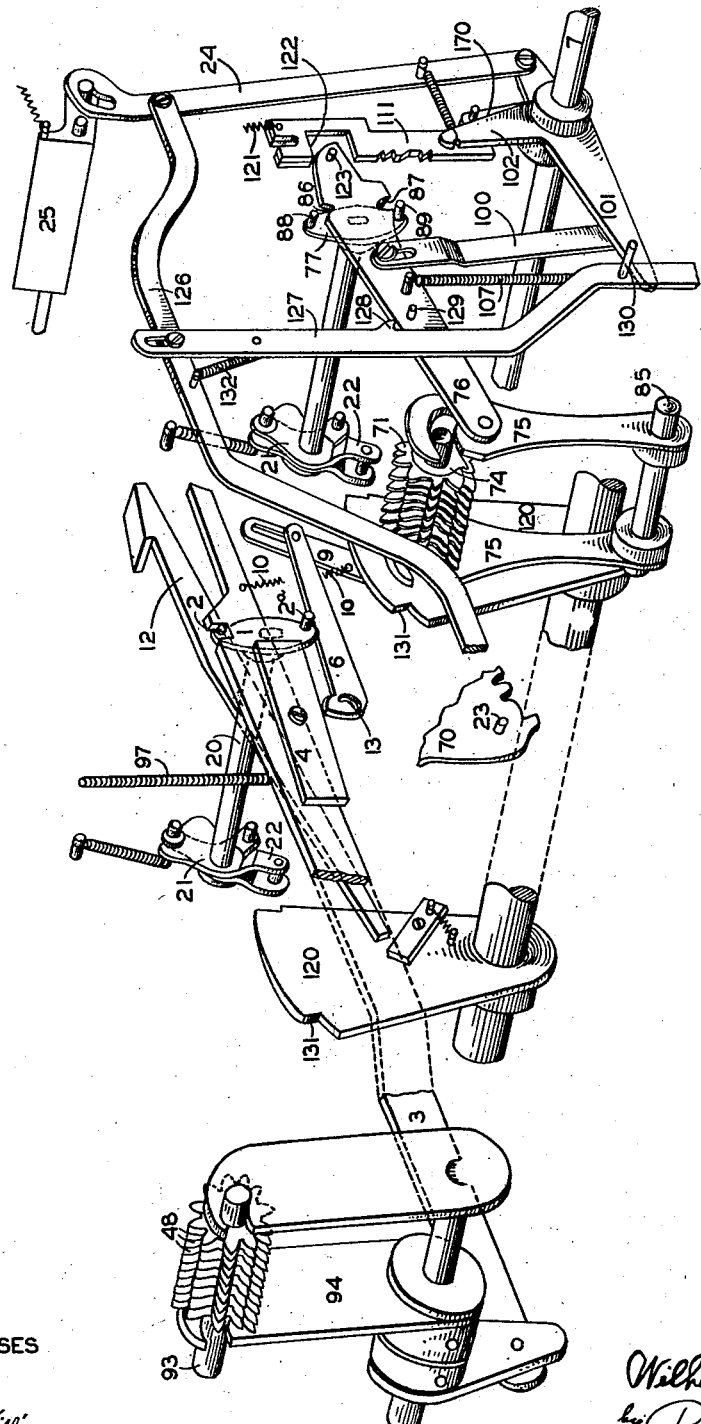

Sept. 15, 1942. W. WEGENER 2,296,075
CARD CONTROLLED BOOKKEEPING MACHINE
Filed Dec. 23, 1930 9 Sheets-Sheet 8
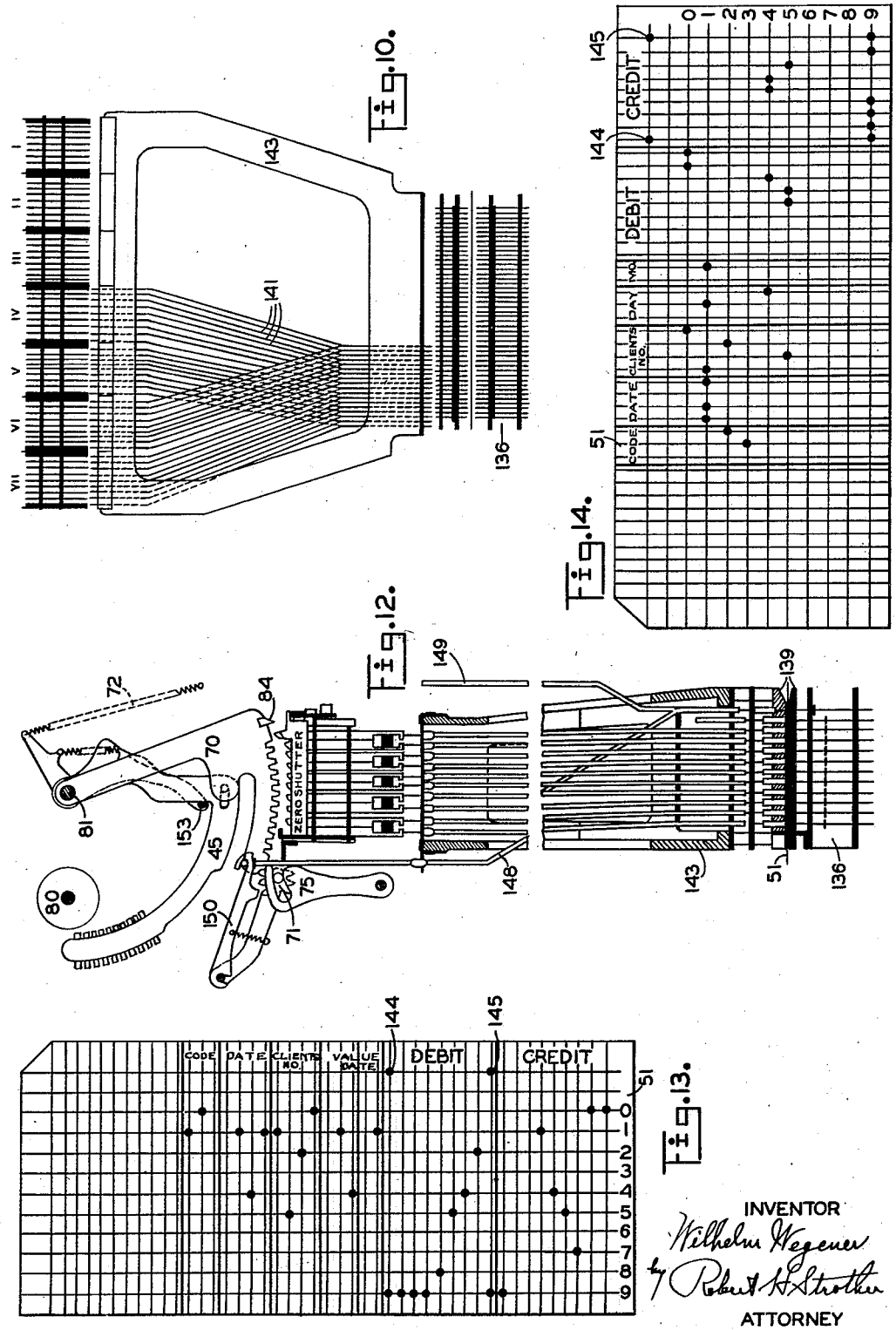
INVENTOR
Wilhelm Wegener
by Robert H Strother
ATTORNEY

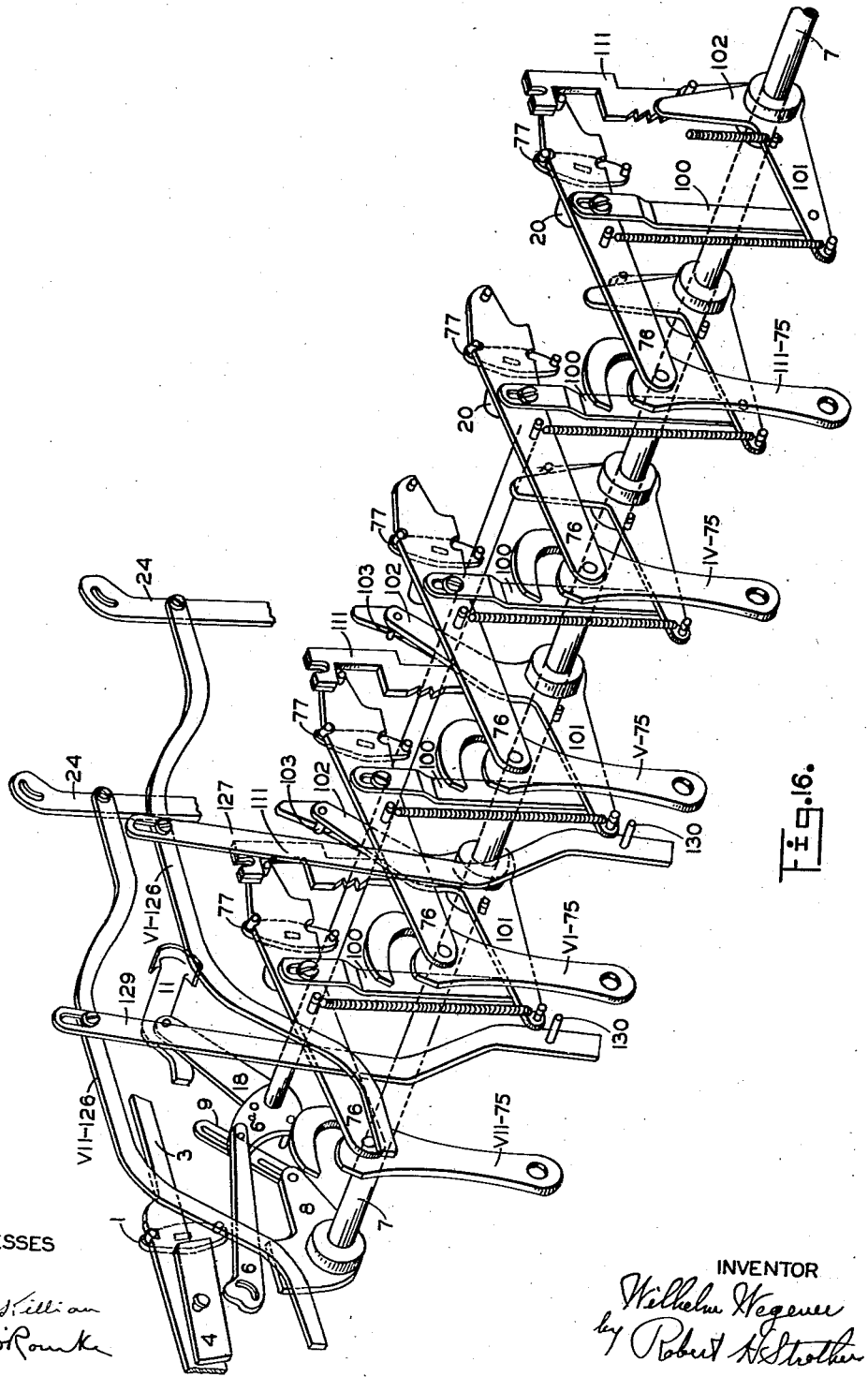

Patented Sept. 15, 1942

2,296,075

UNITED STATES PATENT OFFICE 2,296,075

CARD-CONTROLLED BOOKKEEPING MACHINE

Wilhelm Wegener, Berlin-Schlachtensee, Germany, assignor to Accounting and Tabulating Machine Corporation, New York, N. Y.

Application December 23, 1930, Serial No. 504,336
In Germany December 27, 1929

5 Claims. (Cl. 235—61.7)

My invention relates to tabulating machines operated under the control of perforated cards, and, more particularly, to an accounting machine which is adapted to compute and print balances from a series of debit and credit terms.

One of the objects of my invention is to provide improved means for accumulating grand totals of the series of daily balances resulting from day-to-day debit and credit transactions.

Another object of my invention is to provide an improved construction whereby a daily balance will be automatically taken and transferred into a special totalizer at the end of a sequence of cards representing a series of daily transactions.

Another object of my invention is to provide means for a repetition of the transfer of a daily balance until the next chronological sequence of transaction cards is reached, provided the two sequences are not consecutive.

Another object of my invention is to provide manually controlled means for clearing the totalizer containing the accumulation of the series of daily balances without clearing the daily balance totalizer.

Another object of my invention is to provide a tabulator with plural sets of totalizers identified with debit and credit transactions respectively, with novel means controlled by the printing mechanism for determining which of the dual totalizers will receive the balance after the run of a daily sequence of cards.

Another object of my invention is to provide improved means for computing the amount of interest due to each depositor for the use by a bank of the depositor's funds.

Another object of my invention is to provide means for determining the amount to be credited (or debited) to a depositor's account, with a given rate of interest, for the use by the bank of the depositor's funds.

Other objects of my invention will appear from the description of the invention following hereinafter and the features of novelty will be pointed out in the claims.

Up to the present it is the usual practice in the customary bank accounting systems to perform calculation of interest of the individual accounts as follows:

The primary purpose of a bank is to convert commercial paper received from its customers, clients, or depositors, into cash or its equivalent at the earliest possible moment, so as to have the greatest possible amount of cash, or its loaning equivalent, available for supporting the credit of the bank. All the accounting or bookkeeping within the bank is designed to accomplish this end as efficiently as possible. When a deposit of miscellaneous items such as cash, checks of various kinds, notes, bills of exchange, etc., is made, the credit represented by the deposit must be converted into cash quickly, and the bookkeeping and accounting departments must operate simultaneously with the routine of the necessary conversion. The bookkeepers or accountants, therefore, perform their work largely from memoranda, usually called tickets, based on the usual deposit slips and checks drawn against the various accounts. These memoranda or tickets may have various forms such as, for example, a written slip or a perforated card. Bank accounting is greatly facilitated when the tickets are utilized in the form of perforated cards, as will now appear.

Checks, drafts, and bills of exchange when drawn against an account, are usually passed directly to the auditing and accounting departments where the items of data necessary for the accounting are transformed into perforations in cards. Such perforated cards are either credit or debit cards and their character is represented by special perforations (see Figs. 13 and 14). Other departments of the banks are often authors of tickets, as for example, collections, interest, etc., which may be debit or credit in character, and which are eventually represented as perforated cards of proper character, for example, in the accounting department certain credits originate, such as interest for the use of a depositor's money.

By way of an example, assume a banking institution handling, say, five thousand accounts, involving a range of five to fifteen entries in each account daily. This requires a daily posting of twenty-five to seventy-five thousand items. This is an enormous task, and involves a large personnel and a correspondingly extensive mechanical equipment.

Interest systems as practised in banks, are usually based on the use of interest bearing daily balances in accordance with the "value dates" of debits and credits. There are several reasons for using the daily exchange balance system for figuring interest.

The value date differs from the deposit date because of the following factors:

1. Banks do not, as a rule, pay interest on deposited funds until they are available to the bank as cash for making loans. The date when script representing transactions becomes available for loans is called the value date.

2. The groups of credits or customers' deposits that come into the bank on a given day do not, as a rule, bear interest until the next succeeding day; therefore, such credits are deferred for one day, thus establishing the correct value date.

3. In the usual course of business the greater part of these credits reach the bookkeeping department to be posted as afternoon items. The balances are accordingly posted as afternoon items the following morning, thus automatically determining correct value dates for the majority of the items.

4. The debits (which are largely checks against depositors' accounts, which come through the clearing house in the morning) automatically reduce the balances of the preceding afternoon. Therefore, the exchange balances include the credits of the preceding day, and these balances are sometimes used as the interest bearing balances, and, consequently, the credits of the preceding day are thus automatically deferred for the requisite one day. Hence, balances calculated from clearing house receipts (exchange balances) may be used as value date balances for computing interest.

5. The use of exchange balances for computing interest thus automatically avoids a vast amount of detail as represented by the individual debits and credits.

The exchange balances for any given date must be frequently decreased by debits representing deferred items or funds which will not be available as cash for the use of the bank until a later date; also, it may happen that there are credits which bear interest as of earlier dates. Therefore, provision must be made for corresponding corrections which insofar as interest is concerned, must be either pre-dated, or post-dated with respect to the exchange date. The use of exchange balances, as previously outlined above for determining interest, would seem to be an extremely simple method, but instead (due to these necessary corrections and the usual mode of practicing the system) it is a slow and very cumbersome process, involving a construction of heavy hand-written ledgers, which require extensive analysis by the men to whom this work is entrusted. The accuracy of this work can be determined only by a duplication of all of the computations. Occasionally, it happens that certain customers, or depositors, demand an interest statement. Such interest statements are at best hand copies. The total aggregate balance of each interest ledger must be checked against the total exchange balances on the ledger control as a safe-guard on the correctness of the interest ledgers. The occurrence of Sundays or holidays requires the interest clerk to make an extra day deferment, that is, a transaction posted on Saturday with a one day deferement is entered against the Saturday or holiday-eve exchange balance, as of two days instead of one day, thus introducing added complications.

The calculation of interest in banks, may be compactly visualized as a simple formula:

example, Fig. 1. The general balances or the bank's journal balances represent a summation of a certain series of customer's balances such as given in the above formula.

The first summation sign refers to full business days, and the second summation sign refers to the individual (debit or credit) items or transactions occurring or presented during a business day. In other words, the first summation sign refers to the daily balance of a depositor's account or, what is the same thing, the totals associated with a posting run, and the second sign refers to the accumulations during a series of posting runs.

In the above formula the "Customer's deposit" refers to all credit items to a customer's account and "Customer's withdrawal" is the corresponding debit against the customer's account which occur in the regular run of the customer's business.

The quantity represented by the difference between the "old balance" and "free balance" is that quantity which is determined by the contact between the bank and its customers. Such contacts frequently contain a phrase such as: "The bank will pay interest at the rate of —% on all accounts exceeding the sum of $—," for example, if the sum is $1000.00 and the rate is 4%; the bank contracts to pay 4% interest on an amount exceeding a deposit of $1000.00. In this case the "free balance" is $1000.00 and no interest is paid by the bank on this amount.

"Law merchant charges" are debits for the services rendered by the bank, as, for example, bonuses for loans, brokerage fees, collection fees, etc. Such are represented by memoranda originating in different departments of the bank. Similarly, "Law merchant accruals" are the corresponding credits made to a customer's account. Debits and credits of this nature are those coming under the general term of "Law merchant," that is, the conventions observed in the business world independent of statutory regulations, but not inconsistent therewith.

The term "interest rate" is self explanatory.

The "time factor" is a characteristic of a particular item, and is one which is determined by the interest due date; the date of deposit, or withdrawal, or presentation, or origin of the item, or law merchant conventions, or clearing house constants, etc. The correct assignment of the time factor or characteristic is one which calls for the greatest acumen on the part of the interest man. The combination of this time factor with the due date is known as the "value date" and is the date when interest either begins or ceases.

It sometimes occurs that a special contact between a customer and the bank calls for a rate of interest differing from the usual or standard. The factors $\theta$ and $\phi$ are introduced into the formula to provide for such contingencies.

Every term under a summation sign consists of a sum of two quantities the one, an amount, the other a function of said amount.

When each transaction (true and complementary) with its character (code) date, ledger number (client's number), value date, etc., is record- Customer's balance = $\Sigma\Sigma$Customer's deposit{1+$\theta$(Due date−Deposit date−Collection time)Interest rate}
− $\Sigma\Sigma$Customer's withdrawals{1+$\theta$(Due date−Withdrawal date+Grace)Interest rate}
+ $\Sigma\Sigma$(Old balance−Free balance){1+$\theta$(Interest period)Interest rate}
− $\Sigma\Sigma$Law merchant charges{1+$\theta$(Due date−Value date)Interest rate}
+ $\Sigma\Sigma$Law merchant accruals{1+$\theta$(Due date−Value date)Interest rate}

This is the general summation formula for the bookkeeping of an individual account such as appears on any depositor's ledger sheet, as for ed as perforations in a card it is no longer necessary to differentiate between the various characters or types of transactions for such is represented by one or more special perforations which control special functions in the tabulator (see Figs. 13 and 14). Therefore, one may, for perforated card tabulators, simplify the above formula to:

Customer's balance=ΣΣCustomer's transaction{1+(Due date−Value date)Interest rate} or, what is the same thing—

Customer's balance=ΣΣCustomer's transaction+ΣΣCustomer's transaction(Due date−Value date)Interest rate If the interest rates differ for differing transactions this fact will appear as a control perforation and is, therefore, (at least inferentially) included in the Interest rate. Further, since all requisite dates appear on the cards, a tabulator may construct statements based on exchange dates or value dates, and thus automatically construct the usual exchange statement or the interest statement.

The last formula is divided into two separate and distinct terms. Each will now be briefly considered:

For the purpose of explanation, let it be assumed that a customer's exchange statement is to be constructed. The data from which the statement is to be constructed consists of a series of debit and credit cards identified with the customer's number, and arranged in chronological exchange date order. The pack of cards is placed in the receiving hopper of a tabulating machine. The change of designation mechanism is set to take totals upon a change in the exchange date. The balance obtained for a series of cards, both debit and credit corresponding to a given day, is represented in this formula by the expression "Σ Customer's transaction" and, therefore, represents the customer's balance at the termination of a particular day. A run of the next chronological group of cards will, of course, ordinarily change the last obtained balance. This is indicated by the presence of a second summation sign. Hence, a run of the cards through the tabulator automatically produces the desired daily exchange balances, and, if desired, records all the transactions in chronological order. This type of statement is usually unsuitable for computing interest, for the reasons given at length above.

The preceding paragraph tacitly assumes that an exchange balance is not computed daily. This tacit assumption is made for the purpose of explanation. If there are only two data groups of cards for each account, it is manifest that the mode of operation is in no way altered. If the first group is merely the old balance and the second group is the transaction of the next succeeding business day, we have the solution of the usual daily posting problem for exchange balances.

A grand total mechanism on the tabulator will evidently construct the requisite statement of balances as the final tabulation of a posting run, as will more clearly appear hereinafter.

When an interest statement is required, the cards are sorted for chronological value dates and the second term of the above equation must be calculated.

"ΣΣ Customer's transaction" has the same significance as in the preceding paragraph. Let it be assumed that the old balance corresponds to the first day of an interest period (usually one month). Then the old balance is transferred to another totalizer as soon as a designation, that is, the value date, changes. Due to the fact that this balance will probably change for the next consecutive date, interest should be paid on this amount for one day only. Assuming that the next day contains transactions which change this balance, the changed, or new balance, must also bear interest for one day. In order to eliminate unnecessary multiplications, these two balances may be added together to secure a grand total of balances before multiplying by the interest factor. Such a summation of balances is indicated in the formula by the double summation sign.

It sometimes happens that one or more days (such as Sundays or holidays) may pass without a transaction by the customer. In such event the grand total of balances must contain repetitions of the unchanged balance during the days of the customer's inactivity. The mechanism for effecting this repetition will be described in detail hereinafter. When the entire run of cards through the tabulator is completed, a statement containing value date balances for each day and a grand total of balances for the entire interest period will have been constructed. An example of such a statement is illustrated in Fig. 1.

In the accompanying drawings like reference characters indicate corresponding parts in the different views—

Fig. 1 illustrates an example of a tabulation for determining the amount of interest due by a bank for the use of one of its depositor's funds. This tabulation is called an "Interest statement" in the body of the specification.

Fig. 2 is a diagrammatical, sectional view through the computing unit VII of a Powers tabulator equipped with the invention for automatically accumulating balances for an interest statement and the like.

Fig. 4 is an enlarged view of a portion of Fig. 2 illustrating the manually operable clearing keys.

Fig. 5 is a view showing some of the parts seen in Fig. 4 with one of the manually operable clearing keys pressed in and with the parts operated thereby shifted to moved position.

Figure 2:
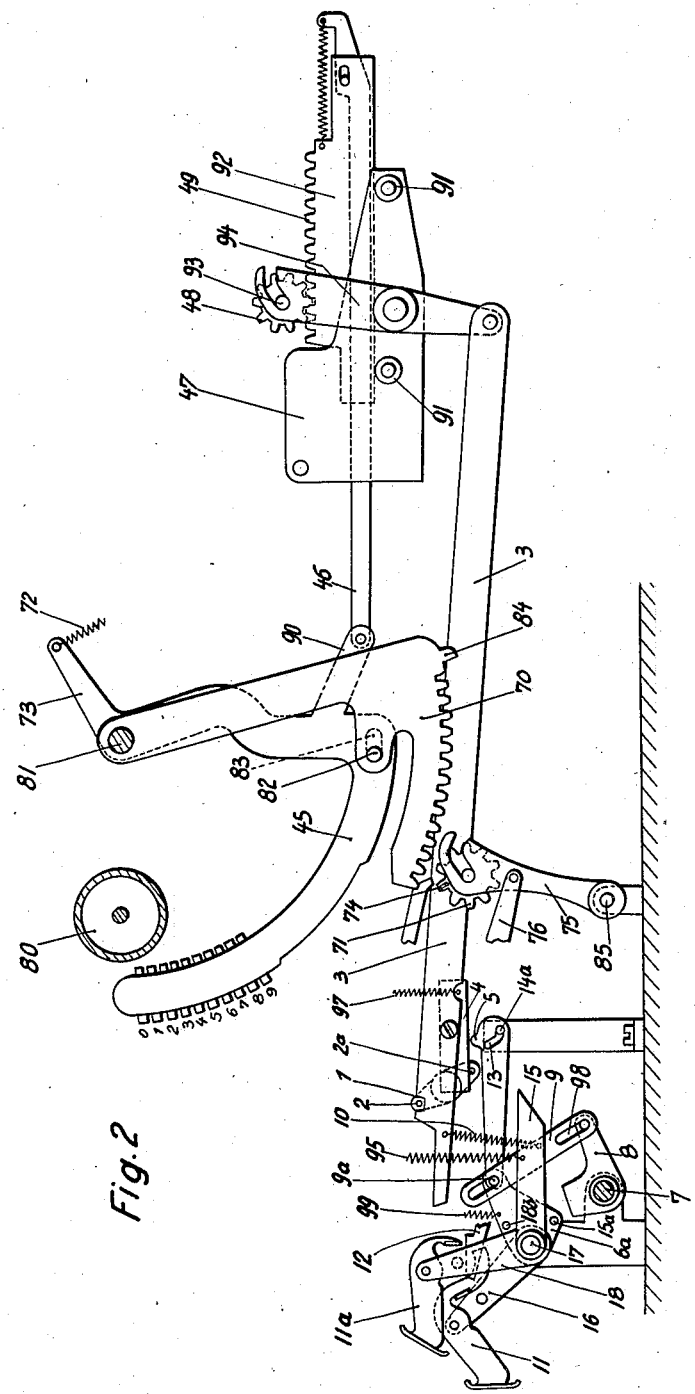

Fig. 6 is a sectional view through a portion of the universal automatic control (U. A. C.) device for effecting a step-by-step repetition of totals.

Fig. 7 illustrates a portion of Fig. 6 with certain of the elements in moved position.

Fig. 8 is a diagrammatic, sectional view through either of the "Balance" computing units applied to a Powers tabulator, showing the relative positions of the parts when the tabulator is in normal position. This figure also shows diagrammatically the connection box, or multiple translator unit, for transmitting amounts from the sensing mechanism to the stop basket of the tabulator.

Fig. 9 is an isometric, diagrammatic view of the totalizer timing mechanism for a "Credit balance" computing unit applied to a Powers tabulator. Said figure also shows the automatic non-print and non-add mechanism associated with this computing unit. A similar mechanism is provided for computing unit VI.

Fig. 10 is a diagrammatic view of a portion of a Powers multiple translator, or connection box, arranged for introducing amounts into two totalizers simultaneously by the aid of wye-wires.

Fig. 11 is a diagrammatic, sectional view through computing units IV and V of a Powers tabulator, showing the block-out mechanism for complemental amounts.

Fig. 12 is a view similar to Figs. 8 and 11 illustrating the mode of converting 9's complements into true complements by tripping transfer latches of the units denominational order (for the insertion of the so-called "fugitive one").

Fig. 13 is a diagrammatic representation of a credit ticket or card such as is used in the practice of this invention.

Fig. 14 is a diagrammatic representation of a debit ticket or card such as is used in the practice of this invention.

Fig. 15 is a diagrammatic view of a non-add slide used in computing unit 3 for the purpose of printing variable designations such as client's or depositor's number and the date, in conjunction with a line of totals.

Fig. 16 is a diagrammatic, isometric view of the totalizer timing mechanism with the mechanism for changing said timing for the totalizers of computing units III, IV, V, VI, VII of the Powers type tabulator. This view illustrates the relative positions and variations in the timing mechanisms for each of the computing units which is necessary for practicing the invention.

Much of the mechanism illustrated in the accompanying drawings represents a known form of Powers tabulator to which my invention is applied. The principal part of the mechanism of the Powers tabulator is illustrated and described in detail in a number of patents: Powers 1,245,502, Nov. 6, 1917, General arrangement, Powers 1,245,504, Nov. 6, 1917, Multiple translator, and Powers 1,245,506, Nov. 6, 1917, Totaling mechanism; Lasker 1,285,252, Nov. 19, 1918, Flexible fan cam, Lasker 1,376,555, May 3, 1921, Totaling mechanism, and Lasker 1,388,271, Aug. 23, 1921, Non-add mechanism; Paris 1,864,051, June 21, 1932, Perforated card control.

Before describing the mechanism of the invention a short description of the bank bookkeeping problem as it is now handled and the modifications thereof when perforated card machinery is applied thereto will be presented.

The principal purpose of the invention herein disclosed is to form an interest table from which the total interest is computed by single, simple multiplication, and automatically from punched cards in a tabulator, the cards being punched to indicate the debit and credit items, a separate table being made for each account. The daily totals, representing the daily balance, are accumulated in a running totalizer from punched cards showing the day's items, and daily balances computed in the running totalizer are transferred automatically to a grand totalizer, which yields a summation of the daily balances for the interest period.

A better understanding of the preceding theoretical mode of operation may be had from the following outline. The characters III, IV, V, VII, in Fig. 1 represent computing units of a Powers tabulator. The tabulator also contains two additional units with which we need not be concerned. A tabulator is preferably set in such a manner that it does not print the detailed items represented by each of the cards fed through the machine, or what is the same thing, it lists totals only. The mechanism for effecting listing of totals only is not a part of the invention herein but such mechanism is fully shown and described in the Patent to Lasker, No. 2,185,259, issued January 2, 1940. The change of designation mechanism is set to trip the totaling mechanism with each change in the value dates so that a total will be printed when the value date designation changes.

At this point it may be noted that in banking systems in which tabulating machines built in accordance with the present invention are designed to function, all interest calculations are made on the basis of 360 days per annum. When interest statements are rendered on a monthly basis each month is deemed arbitrarily to contain thirty days, regardless of the actual number of days in the month. In these systems, all transactions that occur on the thirtieth and thirty-first days of a month are deemed to have occurred on the thirtieth day, and interest computations are made accordingly. Thus, in Fig. 1, which represents an interest statement for depositor No. 1520 for the month of January, the first line of the body of the statement indicates the customer's balance at the end of December, but is carried on the books and designated on the statement as of the thirtieth of December.

In addition to the depositor's number and date other data may be printed by computing units I and II of the tabulator, which need not concern us herein, such as, for example, exchange date and code when constructing exchange statements. Each card is punched with the amount of a transaction in a dual manner, namely, one card field contains the actual amount of the transaction and an adjacent field contains the 9's complement of of the actual value. In the case of a credit card the actual value is introduced into the totalizer of section V, which accumulates the totals of all credit transactions. This amount is also introduced into the totalizer of computing unit VII, which forms the credit balance by the use of wye-wires as is diagrammatically shown in Fig. 10. The complementary value of the transaction is introduced into the totalizer of computing unit VI. Since the machine is set for list totaling only, nothing is printed. A slightly different operation takes place if the amount on the card is a debit. In this case the amount of the transaction is introduced into the totalizers of computing units IV and VI and the complementary value is introduced into the totalizer of the computing unit VII.

When all cards of depositor No. 1520, say, having a value date of December 30, are posted, and, when the first card bearing value date January 1 enters the sensing chamber of the change-of-designation sensing mechanism, the totals, representing positive amounts accumulated (Fig. 1 shows these totals as credits) in the various totalizers, will be printed along with the depositor's number and the corresponding value date. In the particular case illustrated in Fig. 1, there were no debit transactions, hence the printing mechanism of computing units IV and VI was disabled when the totals were printed, the first by the absence of an accumulation, the second by a "complement non-print and non-add" mechanism, which will be fully explained later. The total of the credit transactions (or the old balance) amounted to $3580.00 and such amount is printed by the printing mechanisms of computing units V and VII. It will be understood from the preceding description that the complementary amount of $3580.00 (that is, 9,996,420.00) has been accumulated in the totalizer of unit VI, but, as it would be meaningless on this statement if printed, the printing of it is, therefore, suppressed. When the totaling operation resulting from a change in the value date occurred, the totalizers of computing units IV and V were cleared, but the totals in the running totalizers of sections VI and VII remain in the totalizers. In other words, the running totalizers of sections VI and VII yielded sub-totals only, and these sub-totals were accumulated on grand totalizers associated with said computing units.

After the totals of the first line have been printed a second group of cards bearing the value date of January 1 are fed into the tabulator. These cards represented transactions aggregating $2000.00 of debit transactions and $4500.00 of credit transactions and, when the value date changed, these two totals were printed by their respective computing units. As in the preceding case, the amounts on all cards were entered into the computing unit VI and VII, so that the correct balance will occur therein. Inspection shows that the balance was a $2500.00 credit amount, and such amount was added to the preceding credit balance of $3580.00 in the running totalizer, thus giving $6080.00, and the corresponding complementary amount occurs on the totalizer in computing unit VI, but, being a complementary amount, it is not printed for the reasons given above.

No transaction occurred on the second and third days of January, but it is necessary to carry the balance of $6080.00 forward two days in both of the computing units VI and VII. This can be done in either of two ways. First, when the cards for a particular depositor are being sorted for consecutive value dates, a series of blank cards perforated for value dates only are sorted with the various debit and credit cards. On these cards for which no transactions occur, there will be inserted the extra cards which are blank, except for value dates. These cards will cause a change of designation and a subsequent totaling operation just the same as cards having amounts perforated thereon. This is one way of causing the tabulator to repeat the transfer of the credit balance total of $6080.00 twice into the grand totalizers of computing units VI and VII. The second method is one which does not require the sorting of the extra cards bearing dates only with the depositor's transaction cards. The mechanism for causing the repetition of totals will be described in detail hereinafter, but for the present explanation it will suffice to assume that the machine automatically transfers running totals for each day in which there are no transactions.

On January 4 there were only debit transactions, which totaled $2200.00. This being a debit balance for that day it is necessary for it to be subtracted from the old balance of $6080.00. This is effected by the dual system of perforations which, in effect, is the adding of the complementary amount of the new balance to the old balance of $6080.00, giving $3880.00, which amount is accumulated as a positive quantity in the grand totalizer of computing unit VII. When the value date changed from the 4th to the 5th, the running total (balance) along with the depositor's number was printed as hereinabove described.

On the 5th of January the transactions aggregated $5075.00 of debits and only $700.00 of credits. The balance of this amount is $4375.00 debit, which amount was added complementally to the preceding old credit balance $3880.00, giving a debit balance of $495.00. Since the credit balance is now represented by a complemental amount, it was not printed, but the debit balance is now represented by a positive number and is, therefore, printed by the printing mechanism of computing unit VI, as an incident to an operation of the complement non-print and non-add mechanism.

The 6th of January comprised a series of transactions aggregating $6577.95 debit. This debit balance is then added to the positive debit quantity in the debit balance computing unit VI, giving new debit balance of $7072.95. Of course, the complemental amount of this balance stands on the totalizer of computing unit VII, but, being a complemental amount, it is not printed for the reason hereinbefore stated.

The remaining balances, resulting from various credit and debit transactions, are readily understood from the preceding description, and it will be noted that they switch from debit balances to credit balances, and that these balances are repeated in the event that no transactions occurred on certain days, or sequences of days.

When the entire series of cards for an interest period have been balanced by days as described, it is necessary to obtain totals of the debit balances and credit balances. This is effected by taking a total from the grand totalizers of computing units VI and VII. These totals appear in the last line and are designated as "total of the table of interest." When these totals are multiplied by a factor representing the interest on one dollar for one day, the amount to be debited and to be credited to the depositor's account for the use and lack of use of his money by the bank is obtained.

For the purpose of my invention, I provide the tabulator with special totalizers coordinated to the balancing totalizers of fields VI and VII and operative to accumulate the running total or balance any time the same is printed in these fields.

The embodiment shown in Figs. 2, 3, 4 and 5 represents the Powers Tabulator of the kind that has been manufactured and sold for a number of years and an early form of which is described in the patent to Powers No. 1,245,502 of Nov. 6, 1917. The machine shown in that patent has been modified considerably as shown, for example in the patent to Lasker No. 1,376,555, the Patent 1,864,051, and in other patents, and is equipped with balancing totalizers for computing and printing a record as that illustrated in Fig. 1, and with additional totalizers which are coordinated to such balancing totalizers and were employed heretofore for accumulating grand totals of the credit or debit items.

In order to more clearly understand the invention disclosed herein, a brief general description of the tabulator in general functional terms follows:

The tabulator to which this invention is applied is basically the ordinary Powers tabulator having a computing section comprising seven computing units, five of which are diagrammatically indicated in Figs. 1 and 10, where each unit is conventionally indicated by the Roman numerals III to VII. The tabulator is arranged to operate as a "list total" tabulator, that is, it does not print or list the individual items, but prints the totals thereof only. Computing units I and II are substantially the type diagrammatically illustrated in Fig. 11, but without the catches 147. These units do not contain mechanism affected by this invention. Computing unit III is similar to units I and II except that it is provided with a non-add designating slide so that it may be used for printing variable designations as explanations of the totals, as is indicated in column III of Fig. 1. The printing mechanism of this unit is of the permanent split type, that is, there are no zero-crossovers at certain points so that it may be used for printing the indicia comprising the depositor's or client's number and the date as is illustrated in Fig. 1. Computing units IV and V are similar and are used for accumulating the totals of debit and credit transactions, respectively. Each of these units is provided with the universal blocking device 147 shown diagrammatically in Fig. 11 for blocking the actuating sectors against operation by the presence of a special perforation 144 in the associated complementary number fields of the cards.

Computing units VI and VII resemble computing unit III in that each is provided with a special form of non-add controlling slide which, however, is not used for designating purposes but as a portion of the "complementary non-add and non-print" mechanism for blocking the printing of complementary totals and each of these units is provided with a special running totalizer.

As seen in Fig. 10 the quantities which are entered into computing units IV and V are also entered into computing units VI and VII by the use of branched interpreter wires or Y-wires.

Figs. 13 and 14 show cards which have been perforated for controlling the operation of the tabulator. These cards are of two different characters. The card of Fig. 13 is a credit card on which it will be noticed that the amount perforated in the credit field (the last series of 9 columns) represents a positive quantity and the amount perforated in the preceding or debit field is represented as a 9's complement. Fig. 14 represents a debit card where the amount perforated in the debit field is represented as a positive quantity and the amount perforated in the credit field is represented as a complement of the debit quantity. Each of the cards shown in Figs. 13 and 14 is provided with special perforations 144 and 145 in the 12 position for controlling the computing mechanism of sections IV to VII, inclusive.

Mechanisms such as tens-carrying, printing hammers, card picking and feeding, card control of totaling, zero stop release, automatic control of line spacing during totaling are very briefly described or only briefly mentioned herein for all these mechanisms are well known to those skilled in the art to which this invention appertains. In every case reference has been made to patents which fully show and describe those elements which do not constitute a part of the invention herein.

The intermediate section comprises a form of the usual multiple translator or connection box for transmitting the data represented by perforations to any desired location in the computing section. This device frequently contains special wires such as 146 (Fig. 11) and 148 and 149 (Fig. 12) for controlling certain operations such as automatically correcting complementary amounts and for blocking certain computing units against operation.

The base section is best illustrated in Figs. 6, 8, 11, and 12. The main shaft 135 is driven by a suitable prime mover, and rigidly attached to said shaft is a series of cams for controlling the operation of the machine. The said main shaft drives a series of pairs of feed rolls 57 for feeding cards seriatum from a magazine (not shown) to the sensing chamber 139 above the reciprocatory pin box 136. After the card has been sensed it is fed to a pair of ejecting rolls 138 thence to a storage receptacle (not shown). One of the cams on the main shaft 135 intermittently reciprocates a box or frame 136 which contains a spring pressed pin for every possible perforation of a card to be sensed and is provided with a card stop for temporarily holding the card in sensing position during the time that it is being analyzed. The sensing chamber 139 consists of two matched perforated plates whose perforations correspond to all possible perforations in a card to be sensed and therefore to the locations of the sensing pins. When the pin box 136 is elevated all sensing pins, except those which find perforations, are prevented from rising with the box for they are blocked by the unperforated portion of the card. Those which find perforations pass upwardly with the box to elevate stub wires 140 as is shown diagrammatically in Figs. 11 and 12. The motion of the stub wires 140 is transmitted to the wires 141 of the multiple translator or connection box. This mechanism will be more fully described under the next heading. The sensing box is provided with a total sensing pin 142 which is permitted to travel upwardly a determinate distance for spacing operation and a different determinate distance for a totaling operation whereby the main shaft 135 is connected through a cam and rocker arm to the link 105 to set the total shaft 7 for a totaling operation. It is common practice to insert a stop-card; or a space-card and a total-card; or a space-card, a total-card, and a space-card; after each group of cards to be analyzed. In case a stop-card is used the tabulator stops after the said stop card is sensed and a total key is depressed which rocks shaft 7 to obtain a totaling cycle as is fully described in the patent to Powers, 1,245,502, above cited (see also Mechanism for changing totalizer timing).

It is desirable to avoid the interleaving of the special cards into the pack to be analyzed and the mechanism for eliminating this objectionable feature is known as a change of designation mechanism. The change of designation mechanism herein closely resembles that disclosed in the above cited Paris Patent No. 1,864,051 which mechanism is a self contained unit arranged for attachment to a Powers tabulator for eliminating the need for the operator to insert, between the various groups of cards, space and total cards which determine when the machine is to record a total.

In the present adaptation of this device the tabulator automatically records totals and resumes tabulating operations thereafter, without the need for special cards, during the tabulation of the transaction cards for each interest period. However, in order to record the total for the last day or days of the period it is necessary to place a "30th day" card, perforated only in the "day" field with the date "30", after the last transaction card. When this card is sensed one or more total recording and transferring operations are effected during which the total for the twenty-ninth day, or the totals for the preceding no-transaction days up to and including the twenty-ninth day, are recorded and transferred. In addition, two stop cards are required to be placed after said "30th day" card. When the first stop card is sensed the machine is stopped to permit the actuation of a key 11 to condition the machine to record the credit and debit interest numbers, as hereinafter described. The machine is then restarted and records the interest numbers. Immediately thereafter it is again stopped by the second stop card to permit the actuation of a key 11a to condition the machine to clear the running balance accumulators in units VI and VII, as hereinafter described. When the machine is again restarted the running balance accumulators are cleared, and, in the event another depositor's transaction cards follow the second stop card, the machine proceeds to tabulate another interest statement.

The same principle of a reciprocating pin box co-acting with stationary pin box as used for controlling a set up as in Figs. 8, 11, and 12 is employed, but in this case: (1) The upper pin box 25 (Fig. 6) carrying the pins that sense the card perforations, reciprocates, and the lower box co-acting therewith is fixed; and (2) The two boxes are on opposite sides of the card 51 that is sensed, one above, the other below it.

The reciprocation of the upper box 25 is effected by open cams, whereby the box is positively moved downwards and is spring drawn upwards, hence this box can be latched in its lowest position during a space and total operation even though the open cams continue to operate. The pins 44 in the lower fixed box are spring retained upward, and are lockable in their depressed position by spring pressed latches such as 26. The depressing of a pin 44 to be latched down, accompanied by releasing of another that has been depressed in the lower box is the action which causes the machine to make a space and total recording operation, and to feed a card from the magazine at greatly reduced speed.

The control of the total mechanism from the space-total pin 142 is not changed, but where this universal automatic control (or U. A. C.) is attached it is necessary to locate a thin shiftable metal "space-total" plate having a full set of holes, also a hole for pin 142, all registering with the corresponding holes in the sensing chamber 139. It will be understood that the said space-total plate in the sensing chamber 139, when coincident with the holes of said sensing chamber, does no more than the upper guide plate of the said sensing chamber, but when moved from normal position the pin 142 is controlled to effect a spacing stroke and when further moved from normal position the pin 142 is controlled for a total operation. Thus in effect, this movable space-total plate is actually a space and total card combined, always in place to be slightly adjusted one way or the other to control the movement of the space-total pin 142 to effect a space and total (or space, total, and space) operation. The control of this plate comes from one of a pair of shiftable cams mounted on the shaft carrying clutch element 31, located in the lower portion of the U. A. C. directly under the picker mechanism. This shaft is normally stationary, and is driven by a clutch 31 from the main shaft 135 (Fig. 8). This clutch, 31, is held disabled by an arm 30 obstructing a lug in the clutch disk. A lever 29 pivotally mounted on a supporting shaft carries an arm which is operated on occasion by a latch bar or frame 28, so that any lateral movement of the bar 28 is transmitted through the lever 29 down to the arm 30. The latch bar or frame 28 is responsive to movement of any of the pins 44 through the movement of the latching pins or rods 56. Therefore, no matter which pins 44 or how many of them may be in latched down position, the pressing of another pin 44 will cause a lateral movement of 28, and this will result in the arm 30 getting out of the path of the lug on the clutch disk 31, immediately followed by the engagement of the clutch and rotation of the space-total cam shaft. Assuming that a card 51 is in place to permit only those pins in the upper reciprocating pin box 25 to find perforations on descent, which have their corresponding pin (or pins) 44 in latched down position, the member 28 will rest undisturbed, and the arm 30 will remain in its lower position and the clutch will remain disabled. Should other cards having identically the same perforations be fed through the machine, none of the pins 44 will be affected, and the space-total cam shaft will remain disabled. When a card 51 having a variant perforation is sensed, the depressing of another pin moves member 28 laterally which in turn causes: (1) Restoration of pins 44 previously latched down; and (2) Tripping of arm 30 by lever 29, subsequent engagement of the clutch 31, and such rotation of the connected space-total shaft that the connections to the shiftable space-total plate in the sensing chamber 139 are operated by the one of the shiftable cams on said shaft. It will be understood that when blank cards are fed to the sensing position of the U. A. C., the descent of the upper pin box 25 will result in all the pins 54 being pressed upward. In the case of perforated cards being fed, those pins 54 that find holes to pass through are positively locked for effective depressing and latching down of the corresponding pins 44, of the lower pin box. This locking of the pins is accomplished by the operation of locking slides (not shown) which are delayed in their action until the pin box 25 has descended an appreciable distance. These slides can be set for action according to whichever column on the card is required for designation as is well understood by those skilled in the art. There is a cam on the space-total cam shaft which controls the picker mechanism to subject the same to slower feed, so that the card being then fed will not overtake the preceding card, which has caused the taking of a total of all the cards preceding it. Locking pins (not shown) moving with the pin box 25 cause the locking of the said pin box in its lowest position to hold the card having a changed perforation while a space and a total stroke are being taken. Meanwhile the picker is operating at a greatly reduced speed, but it does not feed the new card to the feeding rolls 57. The additional sensing box 25 cooperating with the space-total plate in the sensing chamber 139 constitutes the outstanding features of the U. A. C.

Having described the general operation of the U. A. C. mechanism it remains to describe the mechanism for causing the machine to intermittently repeat space-total strokes. As has been mentioned hereinabove the change of designation device is set to sense dates. If the change of dates is merely consecutive the operation is that just described. Such repetitions may be effected in a number of ways: (1) Sorting cards having consecutive dates only perforated therein with the cards of each depositor or client; (2) Manual actuation of a special key; and (3) Automatically by a step-by-step mechanism cooperating with a sensing bar for the depressed pins 44. The first method has been fully set forth above in the description of the general operation and it will be understood that such specially perforated cards will cause the U. A. C. device to operate for each change of date as described. The second method consists of a spring pressed special key 27 which may be actuated after the machine has stopped. This method presupposes the use of interleaved stop cards with each group of depositor's cards. When the key 27 is actuated the frame 28 is shifted to release the clutch 31 whereupon the U. A. C. functions for a space and a total stroke in exactly the manner above described. The automatic mechanism requires no special cards or special operations, except to obtain the last total as above described and it consists of a sensing bar 42 for sensing the location of a depressed pin 44 and a step-by-step bar 33 for determining the number of space-total operations. The sensing bar 42 is arranged to be driven in a horizontal direction by a continuously rotating friction wheel 58 directly geared to the main shaft, at a speed in excess of that of the stepwise movement imparted to bar 33. Said bar 42 is provided with a pawl 43 at its forward end for carrying a similarly guided ratchet bar 32. The upper edge of sensing bar 42 is provided with pivotally mounted lugs or projections 42a, 42b, 42c, and a fixed lug 42d, each of which may cooperate with the lower end of a depressed pin 44 determining the extent of motion imparted to it by the friction wheel 58. The lugs 42a, 42b, etc., are arranged so that lug 42a will stop the bar 42 for any date up to and including the ninth, and it, therefore operates to limit the motion of bar 42 in exactly the same way as the lug 84 (Fig. 12) operates to limit the actuator 70 of the computing mechanism. For the purpose of explanation let it be assumed that the lug 42a is against the nine pin 44 and the next date sensed by the U. A. C. is the tenth, then the zero pin 44 will be depressed (the one pin in the next higher denomination of pins 44 also, which is not used for sensing by bar 42) and the nine pin released, then, so far as lug 42a is concerned the bar 42 would continue to travel by the action of wheel 58 but it is stopped by lug 42b contacting with the zero pin 44 after only one step of movement. When lug 42b reaches the nine position (for the 19th day) it also is beyond the field of stops or pins 44 so that lug 42c comes into action in precisely the same way as lug 42a did at an earlier time and remains in action until the 29th day, and similarly for lug 42d which is so far as the present construction is concerned, effective only for the 30th day. Obviously the bar 42 can extend to any desired length as is indicated by the conventional break beyond the last lug 42d. The lugs 42a, 42b, and 42c are each held in substantially horizontal position by a flat spring 42s fixed to the side of bar 42. By this arrangement each lug is held in position to engage a depressed pin 44 as bar 42 moves rightwardly, but may be cammed downwardly by a depressed pin 44 to permit leftward movement of bar 42 when it is restored to its starting position, as hereinafter explained. The pawl 43 engages one of the teeth of bar 32 and hence bar 32 travels with bar 42. In the event that two cards do not have consecutive dates the bars 42 and 32 will continue until arrested by a depressed pin 44 due to the action of revolving member 58 while the U. A. C. is controlling the first space and total operation due to the tripping of clutch 31. The teeth of bar 32 are of a trapezoidal shape and there is a short lost motion between pawl 43 and tooth of bar 32 engageable thereby; hence bar 32 will not be moved quite as far as wheel 58 moves bar 42 and the difference in the distances moved is obviously the magnitude of the lost motion. Also cooperating with the teeth of bar 32 is a feeling tooth 36 which can find an interdental space when and only when the described lost motion exists between pawl 43 and its tooth, otherwise the feeling tooth finds the upper edge of a tooth 32a as is illustrated in Fig. 7. Advantage is taken of the described cooperation between feeling tooth 36 and the teeth 32a to cause repeated space and total operations under control of a step-by-step mechanism, which consists in part of a ratchet bar 33 guided to travel like bars 42 and 32. The bar 33 is given one step of movement during a space-total operation by a cam operated spring pressed rocker arm 61 carrying a pawl 64, driven by cam 60 which is driven by a gear train (not shown) from the driven member of clutch 31 in such manner that cam 60 makes one revolution, and imparts one step of movement to bar 33, during each total taking operation. A retaining pawl 65 holds the bar 33 in shifted position. Said bar 33 is provided with a pin 34 which abuts a projection 35 of bar 32, and when such abutting occurs the pin 34 moves bar 32 an amount corresponding to the requisite lost motion between pawl 43 and a tooth of bar 32 to permit feeling tooth 36 to find an interdental space between the said teeth whereby listing of the daily group of cards, the first of which caused the U. A. C. to begin a space-total operation, is resumed. The feeling tooth 36 is part of a spring pressed slide 39 which is guided for vertical movement by suitably located frame supported studs. The bar 39 is elevated at a suitable time during the operation of the machine by a rocker 38 cooperating with the periphery of a cam face 37 of a two-plane cam which is constantly driven by a gear train (not shown) connected to the main shaft. The elevation is of momentary duration, and if feeling tooth 36 find an interdental space a listing operation follows, but if the feeling tooth 36, finds the top of one of the trapezoidal teeth 32a the slide 39 remains partly elevated so that its hook 40 is disengaged from the companion hook of the spring urged bell crank 41. Said bell crank 41 is held in the position shown in Fig. 6 by a cam face 37' of said two-plane cam when slide 39 is elevated by cam face 37. By means of this arrangement, if slide 39 fully descends bell crank 41 will be locked in position by hook 40, whereas, if the downward movement of slide 39 is blocked by a tooth on bar 32 the spring attached to bell crank 41 rocks it as soon as the high part of cam face 37' passes a predetermined location. In this event bell crank 41 shifts member 28 to initiate a space total operation as described above. The automatic tripping of the U. A. C. by bell crank 41 continues time after time until bar 32 is slightly shifted by bar 33 so that feeling tooth 36 finds an interdental space between two teeth 32a. The timing of this tripping action is such that the tripping of the U. A. C. occurs at substantially the same time as if it were accomplished by the downward movement of sensing box 25; hence the latter remains in downward locked position.

The slides 32, 33 and 42 are returned to normal position at the termination of each statement run by any convenient means such as manually, or by special keys. In the former case the operator disables the holding pawls by hand, then manually shifts said bars to normal position. If a special key such as is diagrammatically indicated at 66 is used, the stem of the key has a cam to elevate the holding pawls and hold them elevated during the restoring operation. It is, of course, understood that the machine is stopped at this time so that there is no possibility of disarranging the timing of the parts.

In the previous description it is assumed that a tabulator constructed in accordance with the invention is applied to the preparation of interest statements for relatively active accounts, i. e., accounts in which the number of days interval between transactions is less than the range of pins 44 in Fig. 6. Under these conditions, as stated above, the machine records and transfers totals automatically for no-transaction days without the need for special cards between the customer's transaction cards. However, in the event a no-transaction interval is greater than the range of pins 44, the above described procedure must be modified slightly. For example, if it is assumed that there are no transactions in a customer's account between the 2d and 17th days of a month, only five total recording and transferring operations would be effected by the present arrangement instead of the fifteen required. This is due to the fact that the initiation of such operations is controlled only from the units column of the "day" field of a card. Obviously the mechanism may be modified to permit total taking to be controlled from the tens column of the "day" field as well as the units column to obtain the necessary operations automatically. However, the same result may be accomplished in the present arrangement merely by inserting a special "date" card in the transaction card stack to break the no-transaction interval. In the above instance, a special card, perforated in the "day" column with the date "9" would be inserted between the transaction cards for the 2d and 17th days. Then the sensing of the change from the date "2" to the date "9" causes the initiation of seven total recording and transferring operations, as lug 42ª moves from engagement with the "2" pin 44 and engages with the "9" pin 44. Immediately thereafter, the sensing of the change from the date "9" to the date "17" causes the initiation of eight additional operations, as lug 42ᵇ moves under the pins 44 from "0" to "6" and engages with the "7" pin 44, to complete the required fifteen recording and transferring operations. In a similar manner, special "date" cards may be used to break any no-transaction interval greater than that accommodated by the pins 44 when the machine is employed to prepare interest statements for inactive accounts.

The intermediate section consists of the usual framework between the skeleton of the base section and the bed plate of the computing section for supporting the latter, and the power drive connections between the main shaft 135 in the base and the auxiliary main shaft of the computing section to which the fan-cams 120 are attached. This mechanism is well known in the art and is omitted from the drawings, thereby avoiding unnecessary complications. The intermediate section also includes an optional form of connection or multiple translator box 143 (see Figs. 8, 10, 11 and 12) which is inserted and removed from the machine at the pleasure of the operator in the usual well known manner. The multiple translator contains sets or groups of interpreter interponents or translators 141 for transmitting movement of the sensing pins which have found perforations in the card being analyzed to stops, or to members to be controlled, in the computing head. Each of the translator interponents consists of a wire, or of branched wires, guided by perforations in the top and bottom of the translator frame 143. The upper perforations are usually constructed as rectangular openings through which a pinched section of the wires passes as is indicated in Figs. 8, 11, and 12. The bottom of the frame 143 consists of a perforated plate which resembles and matches the plates of the sensing chamber. The use of the multiple translator as described permits a single sensing pin to control a stop (or stops if the translators are branched) or an element at substantially any point in the computing section. It has been mentioned that the amounts to be tabulated are represented by dual character perforations. Thus the credit card in Fig. 13 has a credit amount of $145.70 represented by perforations in the "credit" field. The complement of the same amount, namely, 9,999,854.29 is represented by perforations in the "debit" field. Again the "debit" field of the debit card in Fig. 14 has an amount of $554.00 perforated therein and the corresponding complementary amount of 9,999,445.99 in the "credit" field. Fig. 11 shows the mechanism for blocking a computing section against operation. The lower end of the special wire 146 leads to a sensing pin which can pass through a special perforation 145 and the upper end leads to a pivoted latch 147 whose hook extends entirely across the differential actuators of a computing unit, hence elevation of a wire 146 will disable a computing unit. The wires 146 may be branched as is illustrated and described in the German patent to Lorant No. 489,319. Fig. 12 shows the mechanism for tripping the units order transfer mechanism in the complement field to make the necessary correction of one unit in the complement field. The tripping mechanism consists of an interpreter interponent 148 whose lower end is operated by the sensing pin which passes through special perforation 144 and whose upper end leads to a lip on the usual transfer pawl 150 of the totalizer 71. The wire 148 is branched at 149 to operate a similar latch for the running totalizer 48. It will be understood that there is an interpreter interponent 146 and one interpreter interponent 148 for each complemental field. Each field having complemental perforations has the two special perforations 144 and 145 respectively located outside the regular computing field usually in the "12" position. Each of the interpreters 141 is branched or wyed so that each sensing pin can set two different stops, the one in one computing unit and the other in another computing unit as is illustrated in Fig. 10.

The computing section contains the calculating and printing mechanism. The general arrangement and operation closely follows the conventional form, the section is made up of seven separate computing units which are conventionally designated by the Roman numerals I, II, III, IV, V, VI and VII in Figs. 1 and 10. All these sections are alike in general operation and each consists of a plurality (usually nine) of differentially adjustable type carriers 45 (Figs. 2, 8, 11 and 12) and connected wheel actuators 70 loosely pivoted on a shaft 81 near the top of the machine and resiliently urged forwardly by suitably located springs 72, but which are normally held in rearward or retracted position by a universal bail 153 which connects the lower ends of a pair of arms pivoted on the shaft 81. Members 45 and 70 are resiliently connected in the usual manner to provide for tens-carrying. One of the arms carrying bail 153 is provided with a roller stud extending into a slot in the cam arm 155 (Fig. 8) which in turn is connected by the usual link 154 to a fan cam 120 connected (usually resiliently) to the main shaft of the computing head. The construction and arrangement is such that the fan cam 120 moves forwardly a considerable distance before the cam arm 155 shifts the universal bail 153 forwardly so as to provide ample time for the totalizer timing and other mechanisms to properly function. The extent of differential movement of each member 45 and 70 is governed by a lug 84 which abuts against an elevated numeric stop of the stop basket 156. Each stop basket contains the usual ten stops in each denominational order, one stop for each character of the decimal system of numeration, and the usual zero stop shutters in addition. The numeric stops are elevated by the described upward motion of the interpreter interponents 141, which in turn are elevated by the sensing pins passing through perforations in the card being sensed. Each numeric stop is provided with the usual offset to cam the corresponding zero shutter to ineffective position when a stop is elevated, thus governing the extent of the differential motion of the actuators and type carriers by the lug 84 integral with sector 70. After the actuators are returned to normal the numeric stops which have been elevated are returned to normal by a lowering of the usual grid mechanism 157 in the well known manner. Each computing unit is provided with a totalizer consisting of a series of wheels carried by a shaft which in turn is supported by side arms, and are engaged and disengaged at the proper times with the actuators 70 by mechanism to be described later. Each wheel of the totalizer is provided with a single tooth tripping lug 74 for elevating the usual hooked transfer arm (see Figs. 2 and 11) to permit the next higher actuator to travel an extra step of movement thus providing for the necessary transfers. The transfer mechanism is restored to normal in the usual manner during the forward stroke of the actuators. Each computing section is provided with a printing mechanism comprising the normally cocked printing hammers, which are held in cocked position by spring controlled latches which are selectively set for firing by a rocking idler lever controlled by a cam on the type carriers 45 to elevate an interponent pivoted to each latch into the path of a universal bail, which in turn is driven by a link 161 connected to the cam member 155 (Fig. 8). Each computing unit is provided with a non-print bail 25 which is normally in hammer locking position but which is moved when the total shaft 7 is rocked (Figs. 8 and 9). This mechanism will be fully described as an incident to the description of the complement non-print and non-add mechanism. In this way the machine is arranged to list totals only. Detailed descriptions of this mechanism may be found in the patented literature of which the patents to Powers 1,245,502, Lasker 1,285,252, and Lasker 1,388,271 above cited are examples.

Computing units I and II are of type just described, but it is to be understood that they may have any desired form such as the forms which will be described later. These sections do not directly affect the invention claimed herein so they will not be further described.

Figure 3:
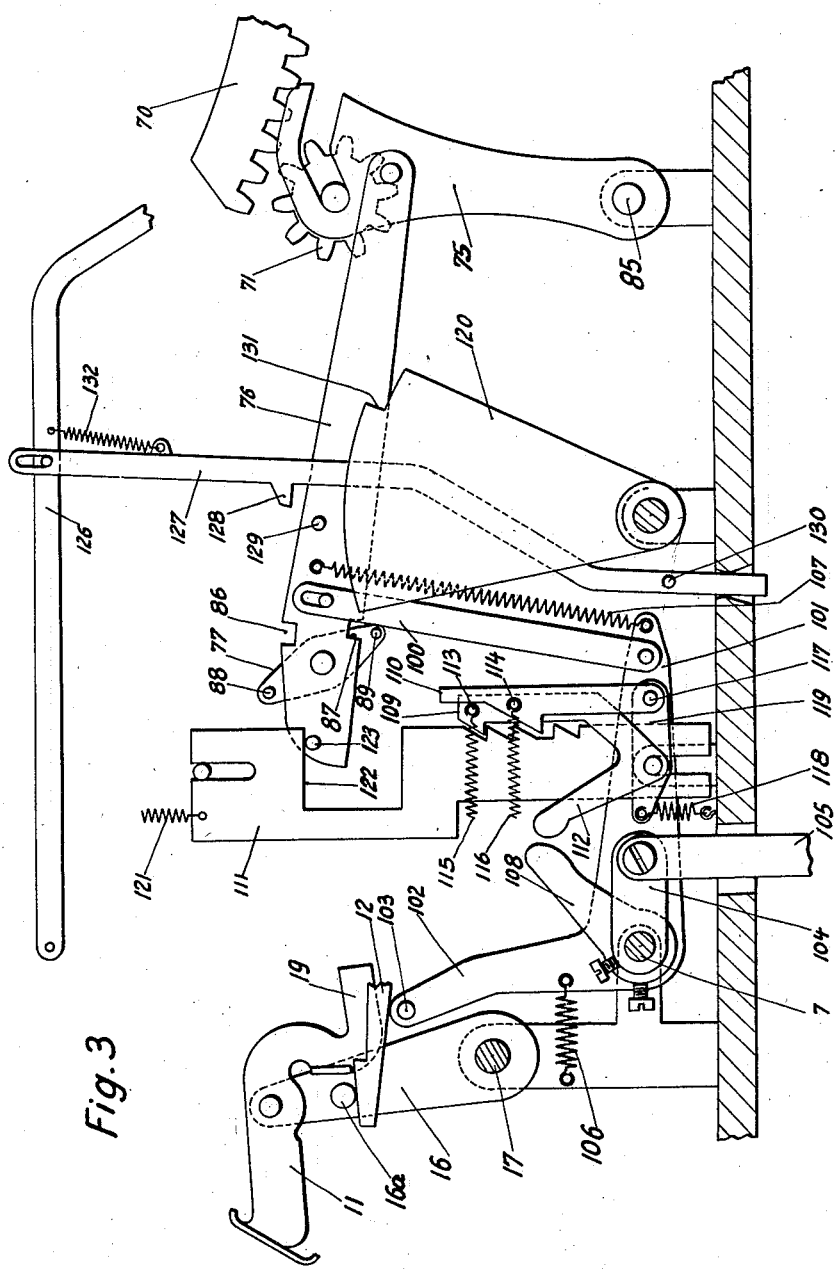
Fig. 3 is a view of some of the mechanism of Fig. 2, illustrating the operation of the automatic non-add slide and a portion of the automatic non-add and non-print mechanism and its cooperation with the companion mechanism of the grand totalizers of computing units VI and VII.

Computing unit III is like that described and it is provided with a non-add slide 111 (Figs. 3, 9, and 15). This slide permits the totalizer of this computing unit to receive the first item of the corresponding card field after a totaling cycle and thereafter to cause said totalizer 71 to remain out of computing relation until the next totaling cycle. In this way variable designating indicia may be printed in conjunction with each line of totals across the record sheet, as for example the client's number and date in Fig. 1. One form of mechanism for accomplishing this function is fully illustrated and described in the above mentioned patents to Lasker, Nos. 1,388,271 and 2,185,259.

Computing units IV and V are provided with actuators 45 having rearwardly extending hooks which are engaged on occasion by latches 147 (Fig. 11) which are shifted to latching position when a complementary amount occurs in their fields thereby preventing movement during an operation of the corresponding bail 153. This mechanism permits the summing of all debits and credits in the respective totalizers of these computing units.

Computing units VI and VII are provided with two totalizers, the one for accumulating all debits, or credits, and the other for summing the interest bearing balances. Each actuator of these computing units has a rearward extension 90 (see Fig. 2) to which is pivoted a link 46 connected by a usual form of spring and pin-in-slot tens-transferring connection to auxiliary actuating racks 92 (Fig. 2). Said racks are mounted to slide freely over anti-friction rolls 91 so that they always partake of the same differential movements as the actuating racks 70, but the construction is such that tens-transferring may occur in either the racks 70 or racks 92 independently of the other, or what is the same thing each rack is mounted for relative movement with respect to a common type carrier. Each set of racks 92 may be engaged by a totalizer 48 which is controlled by various mechanisms to be described later. Said units are each provided with a non-add slide 111 (see Fig. 3) and with a complementary non-print and non-add mechanism. The remainder of the specification will be largely concerned with describing the totalizer and printing control of these computing units.

In machines of this class, it is necessary for the totalizers to perform the computing operations of adding and subtracting; sub-totaling and totaling, either directly or complementally; and non-adding. All these different modes of computation are effected at appropriate times during which the totalizer is in mesh and out of mesh with its actuators. When the actuators move differentially forward out of mesh with their totalizers and are meshed with the totalizers during the return stroke, the operation is called adding; and, if the actuators move forward extents commensurate with the complement of the amount and with the same periods of disengagement and engagement as in adding, the operation is called complementary subtraction. If the actuators move forward when meshed with their totalizer and return free thereof the operation is known as totaling and, if the totalizer contains the complement of the total the operation is complementary totaling. If the actuators move forward and return without being engaged by the totalizer the operation is called non-adding and, if the actuators move forward and return with the totalizer in mesh therewith, the operation is called sub-totaling. The mechanism for effecting these various timings will now be briefly described.

The totalizer wheels 48 and 71 (Figs. 2, 3 and 9) are freely mounted on a frame carrying a shaft such as 93. The said shaft is guided for engaging and disengaging movement by the pairs of cam arms 94 (see Fig. 2) for the totalizer wheels 48 and a similar pair of cam arms 75 for the totalizer wheels 71. The operations of the totalizers 48 and 71 are similar, but to avoid confusion the description of the operation of totalizer 71 will be taken up first. A pitman 76 having a notch 86 in its upper edge and a notch 87 in its lower edge is pivoted at its rearward end to one of the cam arms 75. For the sake of definiteness, it may be stated that a normal position of the totalizer 71 is that in which the pitman 76 has its notch 86 engaged with the upper pin 88 of the double crank 77, and hence the totalizer is engaged with its actuators. The pitman 76 is held upwardly by a slotted link 100 pivoted on a bell crank 101—102 which in turn has its arm 101 held up by a suitably located spring 106. The double armed crank 77 is attached to a frame supported shaft 20. Also attached to this shaft is an arm 21 which has a limited lost motion connection with the spring centralized wiper 22. The said wiper 22 is in the path of the upper edge of the fan cam sector 120 which is usually resiliently connected to the main shaft (see above cited patent to Lasker 1,285,-252). The said main shaft is oscillated by suitable connections to the prime mover as has been described. Very shortly after the beginning of the movement of the main shaft the periphery of the fan cam 120 contacts with the wiper 22 and absorbs the lost motion between the wiper 22 and arm 21 and hence rocks shaft 20 in a direction opposite to that of the movement of the said main shaft and when the upper notch 86 of the pitman 76 engages the pin 88 the cam arms 75 are shifted rearwardly, thus disengaging the totalizer from its actuators 70 so that the latter may travel forwardly free of the totalizer, extents determined by the location of perforations in the card being sensed. The totalizer is held disengaged by the wiper 22 riding on the extreme upper edge of the fan cam 120 during the time required by the actuators for reaching their maximum differential positions. When the edge passes beyond wiper 22 the spring of the wiper centralizing mechanism absorbs the lost motion between said wiper and the arm 21 so that the wiper will be in the path of the radial edge of the notch 131 of the fan cam 120 when the latter starts its return excursion. Contact of 131 with the wiper then pulls the pitman 76 forward so that the cam arms 75 will engage the totalizer 71 with its actuators and it will remain engaged during the return excursion of the said actuators 70. The totalizer will remain in this position until shifted by the fan cam 120 during the initial part of the next adding cycle, unless it is shifted for initiating some other timing of the totalizer. This is a brief description of the totalizer timing which was called adding in the preceding paragraph. The construction and arrangement is such that the centralizing spring will partially rotate the shaft 20 if the pitman 76 is disengaged from pin 88 when the fan cams 120 are in their extreme forward position. If the pitman 76 is now released it cannot re-engage pin 88 due to an interference between the upper edge of said pitman and the said pin 88, see Powers Patent 1,245,502 above cited.

If the bell crank 101—102 is rocked against the tension of its spring by any means (particular means will be described later) the pitman 76 will be lowered by the spring 107 connecting the bell crank and pitman, thus disengaging the upper notch 86 from the pin 88. The lower notch 87 will not at this time engage the pin 89 due to an interference between the pin and the lower edge of the pitman 76 (see Fig. 9) so that the spring 107 is tensioned and link 100 travels downwardly independent of the pitman 76 by virtue of the slotted connection between the members as is shown in Fig. 9. A normal rest position of the totalizer 71 is in mesh with its actuators. As soon as pitman 76 is drawn downwardly the centralizing spring centralizes the wiper 22 and partially rocks shaft 20 so that the notches 86 and 87 will not register with the corresponding pins of the double crank 77. When the fan cam 120 starts forward the shaft 20 and the two-armed crank 77 are rocked by the fan cam 120 as above described; this rocking has no effect on the pitman 76 except to position the lower pin 89 so that it will be engaged by the lower notch 87 under the action of the tensioned spring 107 and such engagement then occurs with a snap. At a point near the beginning of the return movement of the fan cam 120 the shaft 20 is rocked in the opposite direction, thereby shifting pitman 76 rearwardly and thus disengaging the totalizer 71, and allowing the actuators 70 to slam forwardly under the tension of their springs 72, unless slamming is prevented by slam bails. This is the computing operation of totaling mentioned above. This sequence of timing always occurs during a totaling operation, unless inhibited by other mechanisms.

If the pitman 76 is partially lowered and retained in such position that neither notch 86 engages pin 88 nor notch 87 engages pin 89 when the totalizer 71 is out of mesh with its actuators, the rocking of shaft 20 by the centralizing spring and by fan cam 120 will neither engage nor disengage the totalizer. A ratchet operated slide 111 having a shoulder for shifting the pin 123 on the pitman 76 (Figs. 3 and 9) is provided for automatically shifting the pitman 76 to the described mid-position. The shifting of pitman 76 to neutral position may occur at any time after the initial rocking of wiper 22 but before edge 131 contacts the wiper on the return excursion of the fan cam 120. The operation of this slide mechanism will be described hereunder.

The timing so far described relates to the usual totalizers of the Powers tabulator, that is to the totalizers 71 of all computing units. The totalizers 48 are operated similarly through the pitman 3 and the two armed crank 1 with its pins 2 and 2a. The pitman 3 is pivoted at its rearward end to an arm attached to the shaft carrying the cam arm 94. This pitman is provided with a notch in its upper edge for engaging the pin 2. Totalizers 48 are above their actuating racks while totalizers 71 are below their actuators, therefore pitman 3 is pivoted below the pivot shaft of the cam arms 94 instead of above. It therefore follows that the same wiper and double crank construction can be used as above described. The said pitman is normally held upwardly by a spring 97 attached to a pin on the rectangular pawl extending across the lower edge of said pitman, which pawl is pivoted on the said pitman. The pitman 3 is provided with a notch in its upper edge for engaging the pin 2. The function and operation of the pin 2 and the notch in the pitman are identical with those hereinabove described with respect to notch 86 and pin 88 so it need not be further described. The normal condition of the parts for adding on totalizer 48 is illustrated in Fig. 2.

The pitman 3 does not have a lower notch corresponding to the notch 87 of pitman 76. The forward edge of the pawl 4 has a function corresponding to that of notch 87 of pitman 76 (see also Powers Patent 1,245,502 above cited.)

If the pitman 3 is lowered by any means (particular means will be described later) it will be disengaged from the pin 2 so that the totalizer 48 will remain in mesh with its actuators 49 during the forward stroke, thus causing the type carriers 45 to be adjusted in accordance with the total standing on the totalizer. At the beginning of the return stroke of the fan cams 120, the shaft 20 bearing the double crank 1 will be rocked and pin 2a will contact with the forward edge of the pawl 4 to shift the pitman 3 rearwardly, thus disengaging the cleared totalizer 48 from its actuators. The preceding description tacitly assumes that the projection 5 (Fig. 2) does not disable the pawl 4.

If the projection 5 had disabled the pawl 4 by rocking said pawl about its pivot, the rocking of shaft 20 during the return excursion of the fan cam 120 will be ineffective on the pitman 3 and therefore the pitman will remain in the position it had at the beginning of the operation and totalizer 48 will not be disengaged. This is a brief description of the computing operation of sub-totaling.

The totalizers 71 of those computing units provided with totalizers 48 may be in adding timing relation with respect to their actuators during the time that totalizers 48 are sub-totaling, therefore the amounts standing on totalizers 48 will be transferred to totalizer 71 and added to the totals already standing thereon, unless such may be inhibited by the existence of a complement in the one or the other of a pair of the totalizers 48, by the action of the corresponding members 126 and 127 as will be described. Advantage is taken of this mode of transferring sub-totals from the totalizer 48 to the totalizer 71 to effect the summation of the balances, which may be either debit or credit, upon which interest is to be paid or charged as the case may be.

There are five means for changing the timing of the totalizers for effecting differing types of computation; two of the means are manual and the remaining three are automatic. These mechanisms are:

1. Automatic mechanism for non-adding the totalizer 71.
2. Automatic mechanism for non-adding the totalizer 71 when a complement or a negative number is represented in the adjustment of the actuators 70 ("complement non-print and non-add" mechanism).
3. The rocking total shaft 7.
4. The total key 11a.
5. The total key 11.

These means will be briefly described in the order recited.

The automatic non-add slide 111 was mentioned in the description of the totalizer timing operation of non-adding. This mechanism consists of a slide 111 which is normally urged upwardly by a spring 121. The said slide 111 is slidably guided by frame supported elements near its ends. The rear edge of the slide is provided with a series of ratchet teeth which are, on occasion, engaged by spring pressed pawls 109 and 110 (see Fig. 3). The pawl 110 is urged towards the slide 111 by a spring 116 and is pivoted at 117 to the rearward end of a rocking frame 119 which is biased in a counterclockwise direction by a spring 118. The pivot 117 of said pawl 110 is of a length such that it lies in the path of the forward radial edge of the fan cam 120 so that it is forced downwardly against the tension of the spring 118 every time the fan cam moves to its extreme forward position. If the pitman 76 is in its adding position (i. e. engages pin 88) the end of the first forward stroke of the fan cam 120 pulls pawl 110 downwardly carrying with it the slide 111. Said slide contacts with a pin 123 on the pitman 76 thus lowering it to its non-add position. As soon as slide 111 has been lowered the retaining pawl 109 engages the uppermost ratchet tooth of said slide and holds it in this position. This is the normal timing operation of the forward (or grand) totalizers 71 of computing sections VI and VII. These totalizers attain the non-add positions during the first half cycle of operation after a totaling cycle and retain this position while item cards are fed through the sensing mechanism. The described non-add mechanism is disabled when, and only when, the total shaft 7 is rocked. The said total shaft is rocked when, and only when, (during the construction of a statement) it is desired to transfer a sub-total from the totalizers 48 to the totalizers 71 when a date change of designation occurs. For the purpose of automatically disabling the non-add mechanism by rocking total shaft 7, the retaining pawl 109 is provided with a long pin 113 which lies in front of the upward extension of pawl 110 and with a forwardly extending arm 112 which is in the path of the arm 108 fixed to the total shaft 7 so that when the total shaft is rocked the pawls 109 and 110 are disengaged from the ratchet teeth of the non-add slide 111 thus permitting the spring 121 to elevate said slide and permit the spring 106 to shift the pitman 76 to a position such that adding timing may occur. The mechanism described in this paragraph closely resembles the mechanism more fully described and claimed in U. S. patent to Lasker 1,388,271 granted Aug. 26, 1921. This mechanism is provided for sections VI and VII. The corresponding mechanism for section III differs from the preceding in having an extra ratchet tooth on slide 111 for each of the pawls 109 and 110 (Fig. 15) so that the corresponding pitman 76 is not shifted to non-add position until after an entry has been made into the totalizer of said computing unit.

When a total is being transferred from the totalizer 48 to the totalizer 71 the latter totalizer is in non-add condition, if the amount standing on the totalizer 48 is a complementary amount. This mechanism has been briefly mentioned hereinabove as a "complement non-print and non-add" mechanism. The actuating sector 70 of highest denomination of each computing unit is provided with a pin 23 (Fig. 9). If the sector 70 travels forwardly 9 spaces, or what is the same thing, if the totalizer 48 contains a complement of a total this pin will contact with the rearward end of slide 126 when the actuator reaches its 8 position and further movement to its 9 position shifts said slide forwardly, carrying with it the upper end of a vertical bar 127. The lower end of said bar 127 is guided in a hole in the base of the machine as shown in Figure 3. Said bar 127 is provided with a pin 130 which lies in the path of one of the fan cams 120 so that when the fan cam reaches its extreme forward position the link 127 is drawn downwardly; and, if its upper end has been shifted forwardly, its shoulder 128 will lie over the pin 129 on the pitman 76 thus disabling the normal adding timing at the mid-point of the adding operation. Shortly after the shoulder 128 has been thus positioned, the forward edge of one of its fan cams 120 (the fan cam 120 associated with the adjacent computing unit) contacts with the pin 130 on link 127 depressing the latter, thus shifting the pitman 76 to its mid-position. As soon as the pitman 76 reaches its mid, or ineffective, position the centralizing spring rocks the wiper 22 and shaft 20 so that the notch 86 is out of register with pin 88. The pitman 76 is held in its mid or neutral position so that the rocking of shaft 20 by the fan cam 120 on its return will be ineffective because of the non-registry of pin 88 and notch 86, thus insuring that the totalizer 74 will remain in non-add condition. The forward end of the link 126 is pivoted to a post 24 which in turn is pivoted on an arm attached to the total shaft 7. Said post 24 and the link 126 pivoted thereto are resiliently urged rearwardly by a suitably located spring near the lower end of the post 24. The assembly of the members just described is one which must be displaced easily and therefore they can do very little work. It will be seen that these members merely control connections operated by power actuated elements. The upper end of post 24 is provided with an inverted L-shaped slot through which passes a pin rigid with the spring urged non-print bail 25. The non-print bail 25 is normally positioned to block the printing hammers so that normal operation of the machine is a non-print one. When the total shaft 7 is rocked for the purpose of transferring sub-totals from the totalizer 48 to the totalizer 71 the post 24 is elevated and the horizontal member of the inverted slot rocks the non-print bail 25 to its ineffective or hammer unblocking position so that printing would normally occur. The description of the non-print mechanism up to this point applies to all of the computing units. The mechanism for computing units VI and VII differs slightly therefrom as will now be fully described. If, however, the amount on the totalizers 48 of computing units VI or VII to be transferred to the grand totalizer 71 is a complemental amount the link 126 is shifted forwardly as described; such shifting causes the post 24 to be correspondingly shifted thus bringing the vertical part of the inverted L-shaped slot beneath the pin of the non-print bail 25. Since the elevation of post 24 rocked the non-print bail 25 against the tension of its spring the said vertical portion of the L-shaped slot permits said spring to rock the non-print bail to its hammer blocking position thus disabling the printing mechanism when the machine would normally print and add the complementary amount; hence complementary amounts are neither added or printed during a sub-total transferring operation.

Near the front of the machine there is located the usual total shaft 7 to which is fixed a rearwardly extending arm 104 (Fig. 3). Pivoted to said arm is a link 105 extending to the totaling mechanism at the base of the machine. The shaft 7 is rocked after every change in the date of the chronologically arranged cards. Rigidly attached to the shaft 7 is a number of arms: arm 8 (Fig. 2) for controlling the timing of totalizers 48; arms 108 (Fig. 3) for disabling the non-add slides 111; arms 170 (Fig. 9) for shifting certain of the pitmans or links 76 for clearing the corresponding totalizers; an arm (not shown) for releasing the zero stops of the stop baskets 156; a series of arms for elevating the posts 24 to enable the printing mechanism; and an arm (not shown) for temporarily enabling the line space mechanism. Arm 8 (Figs. 2, 4, 5, and 16) carries a pin at its rearward end which passes through the slot 98 in the floating link 9 whose upper end is guided by a slot through which extends a pin 9a at the junction of the toggle between members 6 and 6a. The link 9 is normally held upwardly by a strong spring 10 extending between a stud on said link 9 and stud on the pitman 3. The spring 10 is much stronger than the spring 97 which holds the pitman 3 in its elevated position hence when the shaft 7 and the arm 8 attached thereto are rocked in the direction of the arrow in Fig. 4, the pitman 3 is lowered to its total taking position; nevertheless, only a sub-total will be obtained from the totalizer 48 for the projection 5 lies in the path of the pawl 4 so that the normal operation of the double crank 1 which would disengage the totalizer 48 is rendered ineffective because projection 5 has disabled the rectangular pawl 4 as has been described. The zero stops of the stop baskets 156 are withdrawn in the usual manner. The posts 24 are elevated to enable the printing hammers, and the line space mechanism is enabled in the usual manner. When the shaft 7 returns to normal position the spring 97 elevates the pitman 3 to adding position and therefore the spring 10 elevates the floating link 9 to its normal position shown in Fig. 4. The rearwardly extending cam arms 108 (Fig. 3) fixed to shaft 7 are in the path of the forwardly extending tails 112 of the pawls 109, hence the rocking of said shaft disables the pawls 109 and 110 of each of the non-add slides 111 of the computing units III, VI, and VII so that the springs 106 of the units VI and VII shift their pitmans 76 to adding timing position but the pitman 76 of units III is shifted to totaling position. Heretofore it has been usual to have arms 170 (see Fig. 9) similar to 108 provided with a laterally extending pin lying in the path of the upward extension 102 of the bell crank 101, 102 so that the normal operation of the total shaft 7 resulted in shifting the pitman 76 to a total timing position. This mechanism has been eliminated from the totalizers 71 of the computing units VI and VII but it is retained for the remaining computing units, hence the rocking of the shaft 7 results in adjusting the totalizers 48 for a sub-total operation and the totalizers 71 (of computing units VI and VII) for an adding operation or more accurately for transferring sub-totals from the totalizers 48 to the totalizers 71. The totalizers 71 of the computing units III, IV, and V are cleared in the usual manner by shifting their pitmans 76 to totaling position. This is the combination of totalizer timing operations for printing totals from computing sections IV and V, for printing variable indicia with said totals in computing unit III and for accumulating daily balances; the interest on which, for one day, corresponds to the amounts to be debited and credited at the end of an interest period in commercial bank accounting as has been set forth heretofore.

A key 11a is provided for clearing the totalizers 48; preparatory to constructing a statement for the next depositor. The key 11a is pivotally mounted at the upper end of an arm 18 loosely pivoted on the shaft 17, and the said arm 18 is provided with a laterally extending stud 18a which is caught by a latch 12 when the key 11a is fully depressed. The toggle mechanism comprising a plate 6a and a slide 6 is located between the shaft 17 and the stud 14a on the frame extension 14; the arms of the said toggle are joined at the point 9a by a pin extending through the upper slot of the floating link 9. The plate 6a of the said toggle is provided with two pins 18b and 15a. The pin 18b is in the path of movement of the arm 18 so that when key 11a is actuated the toggle is straightened, thus lowering pin 9a and shifting the floating link 9 downwardly, which movement, through the strong spring 10, adjusts the pitman 3 to its totaling position as described for rocking the total shaft 7. The straightening of the said toggle shifts the link 6 rearwardly whereby the cam slot 13 rides over the fixed pin 14a thus lowering the projection 5 out of the path of the rectangular pawl 4 so that it will be engaged by the pin 2a of the double crank 1 when the shaft 20 is rocked by the fan cam 120 near the beginning of its return movement, thus effecting the total timing operation of the totalizer. When the fan cam 120 which operates pitman 3 (see Fig. 9) has returned to approximately normal position, the forward end of the latch 12 is rocked downwardly by the one way toggle pawl thereby releasing the key 11a and thus permitting: (a) spring 97 to elevate the pitman 3 to potential adding timing position; (b) spring 10 to elevate the floating link 9 to its normal position; (c) spring 99 to restore the toggle members 6 and 6a to the position of Fig. 4; and (d) spring 95 to rock the arm 15 which is rigidly attached to the shaft 17 upwardly, thus shifting key 11a to its normal position. Key 11a is provided with a lateral flange overlying the pawl 12 (Figs. 2, 3, 4, 5, and 9) so that if the forward end of said key is rocked upwardly the latch 12 may be disengaged from the stud 18a.

A key 11 is provided to cause the totals on the totalizers 71 of computing units VI and VII to be printed and to clear said totalizers, that is it positions the corresponding pitman 76 for a totaling operation. Referring to Figs. 3, 4, 5, and 16, the key 11 is loosely pivoted at the upper end of an arm 16 fixed on shaft 17. This arm is provided with a laterally extending stud 16a which is caught by the spring latch 12 when the said key is fully depressed. Said key is provided with a turned over flange 96 which will release the pin 16a if the forward end of the key 11 is elevated. Also rigidly attached to the shaft 17 is an arm 15 which is normally urged upwardly by a spring 95. Extending into the downward path of arm 15 is a pin 15a on member 6a of the toggle members 6a—6, hence, rocking of the shaft 17 results in the lowering of the pojection 5, and a lowering of the pitman 3 by a straightening of said toggle as described in the preceding paragraph. The forward end of the key 11 is provided with a tail piece 19 which lies in the path of the extreme forward end of the pitman 3 when the latter is lowered. Pressure on the key 11 therefore results in shifting the pitman 3 rearwardly, hence disengaging the totalizers 48 for a non-adding timing operation. Rocking of the double armed crank 1 will be ineffective on the pitman 3 during the operation of the machine with key 11 depressed, since the pitman 3 has been shifted rearwardly and when pin 2a moves rearwardly with the initial part of the return movement of the fan cam 120 it will not contact with pawl 4 hence the totalizers 48 will be in non-adding position even though pitman 3 was lowered as in a totaling timing operation. Fixed to the shaft 17 is a series of arms 16 which lie in the path of pins 103 at the upper ends of the bell crank levers 101, 102 (see Fig. 3) hence rocking of said shaft 17 lowers the pitman 76 of computing sections VI and VII through the links 101 and springs 107 to potential totaling position so that a regular operation of the machine results in clearing the totalizers 71.

If a complementary amount should exist in the totalizer 71 the said totalizer will be cleared but the total will not be printed for if such a complementary amount exists the pin 23 on the highest sector 70 will shift the link 126 (see Fig. 9) to disable printing, the shoulder 128 will be shifted over the pin 129 but the pitman 76 is at this time in total timing condition, that is its lowermost position, hence the shoulder 128 will not have the effect of changing the total timing adjustment of pitman 76 to a non-adding adjustment.

When the fan cam 120 for operating pitman 3 reaches about the normal position the usual toggle pawl thereon will rock the latch 12 to permit (a) the spring 97 to elevate the pitman 3 to potential adding timing position; (b) the spring 10 to elevate the floating link 9 to normal position; (c) the spring 99 to restore the toggles 6a—6 to normal; (d) the spring 95 to rock the shaft 17 with the key 11 on arm 16 to normal position; and (e) the spring 106 to rock the bell crank levers 101—102 to restore the pitman 76 to potential adding position.

What I claim is:

1. In a machine of the class described, accumulators, means for transferring data from one accumulator to another, means for analyzing record cards in succession, means for causing repeated operation of said transferring means, means controlled by said analyzing means for determining the difference in value between representations on successively fed records and means controlled thereby for determining the number of repeated transfer operations.

2. In a machine of the class described, means for transferring data from one accumulator to another, means settable in accordance with the number of transfer operations performed by the machine, means settable in accordance with the value of representations on a perforated record card, and means jointly controlled by said devices for initiating a plurality of transferring operations equal to the difference in value between the settings of said devices.

3. In a record controlled tabulating machine having a plurality of accumulators and means to analyze record cards in succession, and wherein totals are transferred from one accumulator to a second accumulator, the combination of cyclically operated means to cause repeated total transferring operations, a member movable through a variable number of steps, means for causing said number of steps to be equal to the numerical difference between sensed values, a second member arranged for step-by-step movement, means operated during total transferring to move said second member one step during each total transferring operation, and means controlled jointly by the first and second members to terminate total transferring by disabling said cyclically operated means when the second member is moved a distance equal to that moved by the first member.

4. In a record controlled tabulating machine having a plurality of accumulators and means to analyze record cards in succession, and wherein totals are transferred from one accumulator to a second accumulator, the combination of cyclically operated means to cause repeated total transferring operations, a member movable through a variable number of steps, means for causing said number of steps to be equal to the numerical difference between sensed values, a second member arranged for step-by-step movement, means operated during total transferring to move said second member one step during each total transferring operation, a second cyclically operated means to terminate total transferring by disabling said first cyclically operated means, and means controlled jointly by the first and second members to render said second cyclically operated means ineffective until the second member is moved a number of steps equal to that moved by the first member.

5. In a record controlled tabulating machine having a plurality of accumulators and means to analyze record cards in succession, and wherein totals are transferred from one accumulator to a second accumulator, the combination of cyclically operated means to cause repeated total transferring operations, a first bar member movable through a variable number of steps, means for causing said number of steps to be equal to the numerical difference between sensed values, a second bar member arranged for step-by-step movement, means operated during total transferring to move said second bar member one step during each total transferring operation, a cyclically operated latching means to terminate total transferring by disabling said cyclically operated means, a toothed member movable by said first bar member, a lost motion connection between said first bar member and said toothed member whereby said toothed member is moved approximately one-half step less than the first bar member during each movement of the first bar member, a tooth sensing means governing the action of said latching means, said sensing means being arranged to permit the operation of the latching means when a half-step position of the toothed member is sensed and to prevent the operation of the latching means when a full step position of the toothed member is sensed, and means operated by said second bar member to move said toothed member one-half step when the second bar member is moved the last step of a number of steps equal to that moved by the first bar member.

WILHELM WEGENER.